(12) United States Patent
Kinnanen et al.

(10) Patent No.: US 7,819,459 B2
(45) Date of Patent: Oct. 26, 2010

(54) CONVERTIBLE VEHICLE

(75) Inventors: Matti Kinnanen, Laitila (FI); Olli Hyytiä, Uusikaupunki (FI); Jari Mattila, Laitila (FI)

(73) Assignee: Valmet Automotive Oy, Uusikaupunki (FI)

( * ) Notice: Subject to any disclaimer, the term of this patent is extended or adjusted under 35 U.S.C. 154(b) by 0 days.

(21) Appl. No.: 12/369,334

(22) Filed: Feb. 11, 2009

(65) Prior Publication Data
US 2010/0201150 A1  Aug. 12, 2010

(51) Int. Cl.
*B60J 7/20* (2006.01)
*B60J 7/00* (2006.01)

(52) U.S. Cl. .............. 296/107.08; 296/107.12; 296/190.05; 296/190.06

(58) Field of Classification Search .............. 296/107.8, 296/136.01, 136.04, 136.05, 136.06, 121, 296/108, 107.01, 107.12, 107.09, 107.11, 296/107.17, 117, 116, 112
See application file for complete search history.

(56) References Cited

U.S. PATENT DOCUMENTS

| | | | |
|---|---|---|---|
| 5,823,606 A | 10/1998 | Schenk et al. | |
| 6,857,686 B2 | 2/2005 | Willard | |
| 7,278,675 B2 * | 10/2007 | Queveau et al. | 296/107.08 |
| 7,300,095 B2 * | 11/2007 | Rawlings et al. | 296/116 |
| 2002/0105205 A1 * | 8/2002 | Willard | 296/107.07 |
| 2005/0077751 A1 * | 4/2005 | Guillez et al. | 296/107.08 |
| 2006/0038426 A1 * | 2/2006 | Habacker | 296/107.08 |
| 2006/0197355 A1 * | 9/2006 | Habacker et al. | 296/121 |

FOREIGN PATENT DOCUMENTS

JP  2001063374 A  *  3/2001

* cited by examiner

*Primary Examiner*—Patricia L Engle
*Assistant Examiner*—SunSurraye Westbrook
(74) *Attorney, Agent, or Firm*—Young & Thompson

(57) ABSTRACT

A convertible vehicle having an openable roof structure (1), said vehicle comprising a trunk lid (5), said trunk lid being supported by a guide linkage (6). The roof structure (1) is lowerable into a folding-top compartment (7) located in an upper region of the trunk (8) of the vehicle under said trunk lid. The vehicle also comprises a frame (9) on which said trunk lid (5) is articulated via said guide linkage (6). The frame (9) is supported to the lower rear end region of the bodywork by a flexural spring (10) enabling turning of the frame.

18 Claims, 6 Drawing Sheets

CONVERTIBLE VEHICLE

FIELD OF THE INVENTION

The present invention relates to a convertible vehicle as defined in the preamble of claim 1.

BACKGROUND OF THE INVENTION

U.S. Pat. No. 5,823,606 describes a convertible vehicle having a roof structure, the roof structure being pivoted via a positive guidance device, fixedly supported on the bodywork of the vehicle, from a closed position where it rests against a front windscreen frame and covers a passenger compartment region into an open position and towards a tail-end region of the vehicle. The vehicle comprises a trunk lid, said trunk lid being supported by a guide linkage. The roof structure is lowerable into a folding-top compartment located in an upper region of the trunk of the vehicle under said trunk lid. The vehicle also comprises a frame on which said trunk lid is articulated via said guide linkage. The frame is supported by a hydraulic cylinder and a gas spring which are pivoted at a pivot point on the bodywork in a lower vehicle end region. This arrangement enables pivoting of said frame in a longitudinal vertical plane of the vehicle. The trunk lid can be pivoted by a first movement by guidance of the guide linkage from a closed position into a first open position opening the trunk towards the rear to enable loading and unloading said trunk. A forward end of the trunk lid together with a forward end of the frame can be pivoted upwards by a second movement from the closed position into a second open position to expose upwards the folding-top compartment for enabling the roof structure to be lowered into the open position and into the folding-top compartment.

This opening and closing device of the trunk lid requires a relatively large number of parts and is relatively heavy, and the cost associated with fabricating the device increases. Further, the pivot point brackets at the bottom of the trunk, the hydraulic cylinder and the gas spring, and their path during the second movement require much space in the trunk. It is also hard to find a suitable place for the pivot point inside the sealing line of the trunk. Moreover, the pivot point always requires some kind of a bearing which is expensive and a part that wears. With the known arrangements of connecting the frame to the bodywork it is not possible to achieve an optimal path of the frame and the trunk lid during the second movement to the second open position.

U.S. Pat. No. 6,857,686 describes another way of connecting the frame to the bodywork. A four bar non-scissor linkage assembly is attached to the frame and adapted to be attached to the bodywork of the vehicle. Also this arrangement with its many links and bearings is space-requiring, expensive and susceptible to wear.

In light of the foregoing, a need exists for a simple, non-expensive, non-wearing and compact connecting element to connect the frame to the bodywork.

OBJECT OF THE INVENTION

The object of the present invention is to overcome the above-mentioned drawbacks.

SUMMARY OF THE INVENTION

The foregoing and other objects are achieved in accordance with the teachings of the present invention through the provision of a new and improved convertible vehicle in which the connecting element between the frame and the bodywork is a flexural spring having a first end region fixed with respect to the bodywork and a second end region fixed to the frame.

The invention has the advantage that the flexural spring can be freely placed inside the sealing line of the trunk.

The invention has a further advantage that, if needed, the theoretical pivot point provided by the flexural spring can be defined to a location where a physical pivot point could not be placed at all, for example outside and spaced from the bodywork.

Another advantage is that the flexural spring is compact and simple.

A further advantage is that with the flexural spring it is possible to design an optimal path for the frame.

A further advantage is that no bearings are needed.

A still further advantage is that the flexural spring is inexpensive and easy to install.

In an embodiment of the convertible vehicle the flexural spring is a leaf spring.

In an embodiment of the convertible vehicle the leaf spring consists of a single leaf.

In an embodiment of the convertible vehicle the leaf spring has a substantially rectangular shape with a uniform thickness.

In an embodiment of the convertible vehicle the leaf spring is made of spring steel.

In an embodiment of the convertible vehicle the leaf spring is made of fiber reinforced plastic.

In an embodiment of the convertible vehicle the frame is supported to the bodywork by at least two flexural springs spaced from each other in a lateral direction of the vehicle.

In an embodiment of the convertible vehicle the vehicle comprises a front stop for limiting the bending of the flexural spring in a forward direction, and a rear stop for limiting the bending of the flexural spring in a rearward direction.

In an embodiment of the convertible vehicle the first end region of the flexural spring is fixed to the bodywork by a first clamp assembly comprising a first front clamp plate fixedly connected to the bodywork, and a first rear clamp plate fixed by a first bolted joint to the first front clamp plate, the first end region of the flexural spring being pressed between the first front clamp plate and the first rear clamp plate.

In an embodiment of the convertible vehicle the first front clamp plate has a planar extension surface extending alongside the front side of the flexural spring along a part of the free length of the flexural spring and forming said front stop.

In an embodiment of the convertible vehicle the first rear clamp plate has a curved extension surface extending alongside the rear side of the flexural spring along a part of the free length of the flexural spring and forming said rear stop.

In an embodiment of the convertible vehicle the frame comprises a horizontal bar running perpendicularly with respect to a longitudinal axis through said vehicle, said horizontal bar having a second clamp assembly by which the frame is fixed to the second end region of the flexural spring, and supporting legs fixed at the ends of the horizontal bar and extending forwardly, a guide linkage being connected to each of said supporting legs.

In an embodiment of the convertible vehicle the second clamp assembly comprises a second front clamp plate fixedly connected to the horizontal bar and a second rear clamp plate fixed by a second bolted joint to the second front clamp plate, the second end region of the flexural spring being pressed between the second front clamp plate and second rear clamp plate.

In an embodiment of the convertible vehicle the first clamp assembly comprises a bracket for supporting the horizontal bar in a closed position of the trunk lid and the frame.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENT

The following detailed description makes reference to directions by terms "forward", "rearward", "front", "rear", "lateral". "Forward" is understood with respect to the normal forward driving direction of the vehicle.

FIGS. 1 to 4 show a rear part of a convertible vehicle having a roof structure 1. In this embodiment the roof structure is hard-top including rigid roof parts, a front roof part 27 and a rear roof part 28 having a rear window 29. However, the invention is not limited to any particular type of convertible roof structure.

Figure 1:
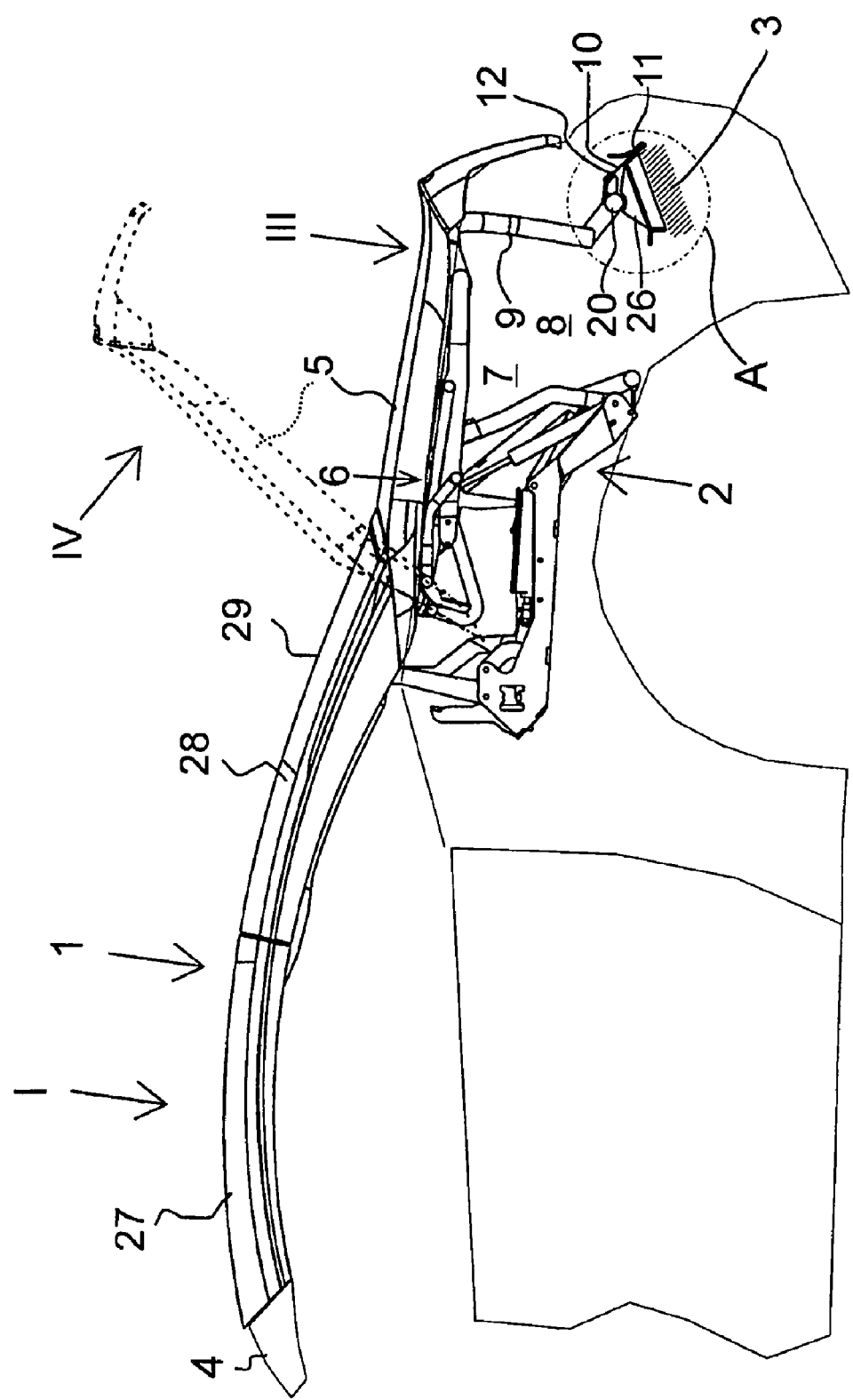
FIG. 1 is a schematic side view of the tail-end region of the convertible vehicle when the roof is in its closed position and the trunk lid can be opened from a closed position to the first open position schematically drawn with a dash line.
Figure 2:
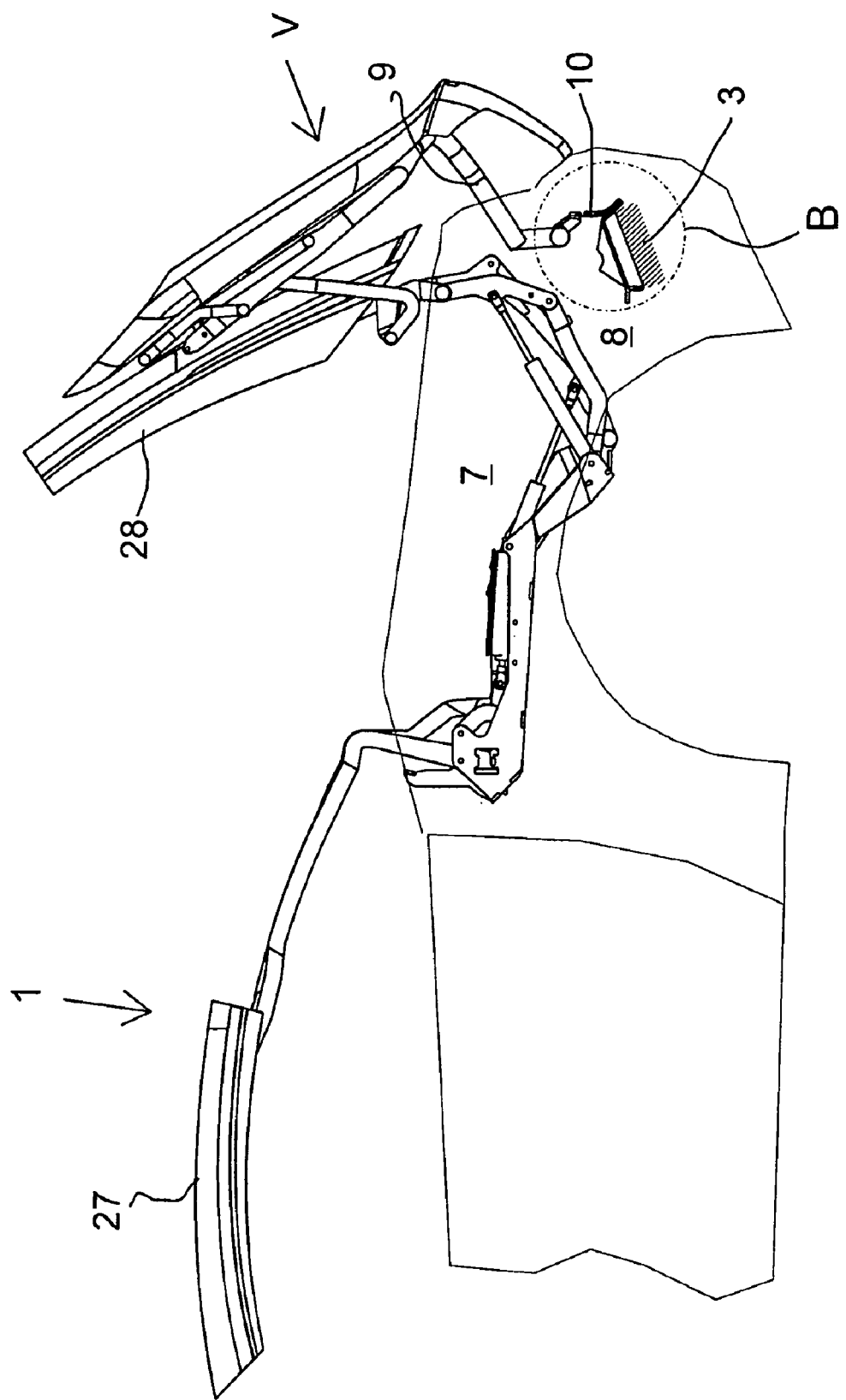
FIG. 2 is a side view similar to FIG. 1 but showing the trunk lid and the frame in a second open position towards the rear side, the roof structure being in an intermediate position as it is packed to the folding-top compartment.
Figure 3:
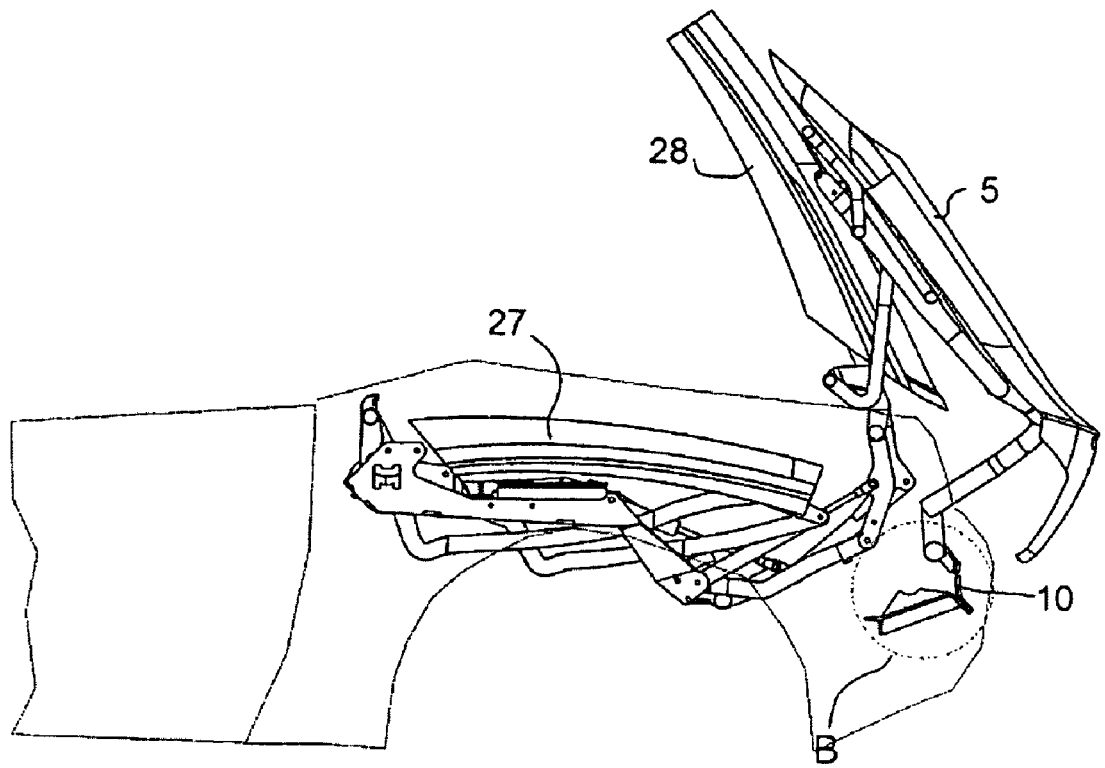
FIG. 3 is a side view similar to FIG. 2 but showing a subsequent intermediate position of the roof structure as it is partly packed to the folding-top compartment the trunk lid and the frame still being in the second open position.
Figure 4:
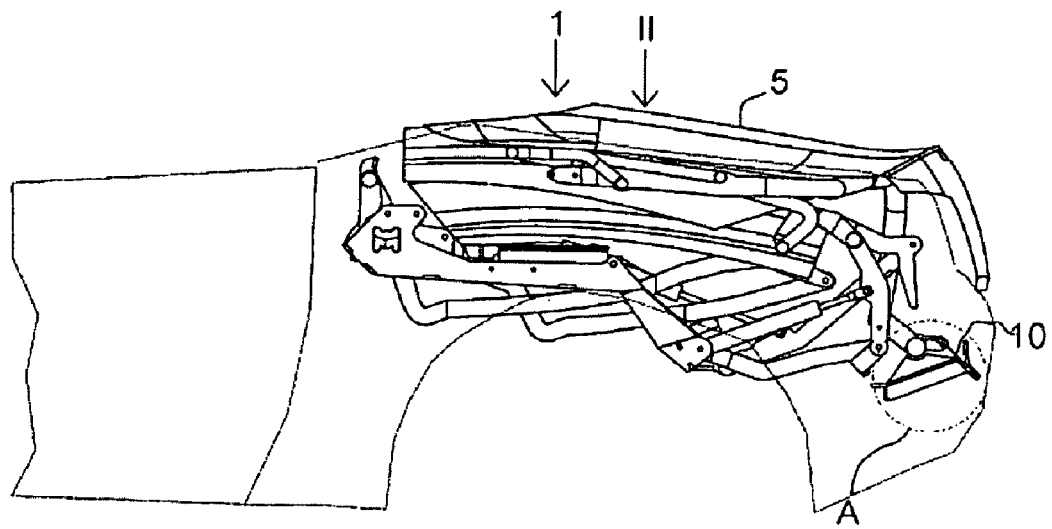
FIG. 4 is a side view similar to FIG. 3 but showing the roof structure completely packed in the folding-top compartment the trunk lid and the frame being in the closed position.

As can be seen in FIGS. 1 to 4 the roof structure 1 can be pivoted via a positive guidance device 2 fixedly supported on a bodywork 3 of the vehicle from a closed position I, shown in FIG. 1, whereby the front end of the front roof part 27 rests against a front windscreen frame 4 and the roof structure 1 covers the passenger compartment region of the vehicle, to an open position II, shown in FIG. 4, towards a tail-end region of the vehicle and into a folding-top compartment 7 which is located in an upper region of a trunk 8.

The trunk lid 5 is supported by a guide linkage 6 to a frame 9 so that the trunk lid 5 can be pivoted by a first movement by guidance of the guide linkage 6 from a closed position III to a first open position IV wherein the rear end of the trunk lid is lifted upwards thus opening the trunk towards the rear to enable loading and unloading goods to and from the trunk.

The frame 9 is supported by a flexural spring 10 on the bodywork 3 in a lower vehicle end region. The flexural spring 10 allows turning of the frame 9 and the trunk lid 5 connected to the frame 9 so that a forward end of the trunk lid 5 together with a forward end of said frame 9 are turned upwards by a second movement from the closed position III to a second open position V, shown in FIGS. 2 and 3, to expose upwards the folding-top compartment 7 for enabling the roof structure 1 to be moved to the open position II and into folding-top compartment 7.

As can be seen in FIGS. 5 to 8, the flexural spring 10 has a first end region 11 fixed with respect to the bodywork 3 and a second end region 12 fixed to the frame 9.

In the shown embodiment the flexural spring 10 is a leaf spring consisting of a single leaf made of spring steel which has a rectangular shape and a uniform thickness. For example, the thickness of the steel leaf spring can be 0.8 mm, width 40 mm and bending free length between clamps about 60 mm. The leaf spring 10 can also be made of fiber reinforced plastic, e.g. carbon fiber composite.

The mounting arrangement of the leaf spring 10 can be seen in FIGS. 5 to 9. The frame 9 is supported to the bodywork 3 by two leaf springs 10 spaced from each other in a lateral direction of the vehicle.

Figure 5:
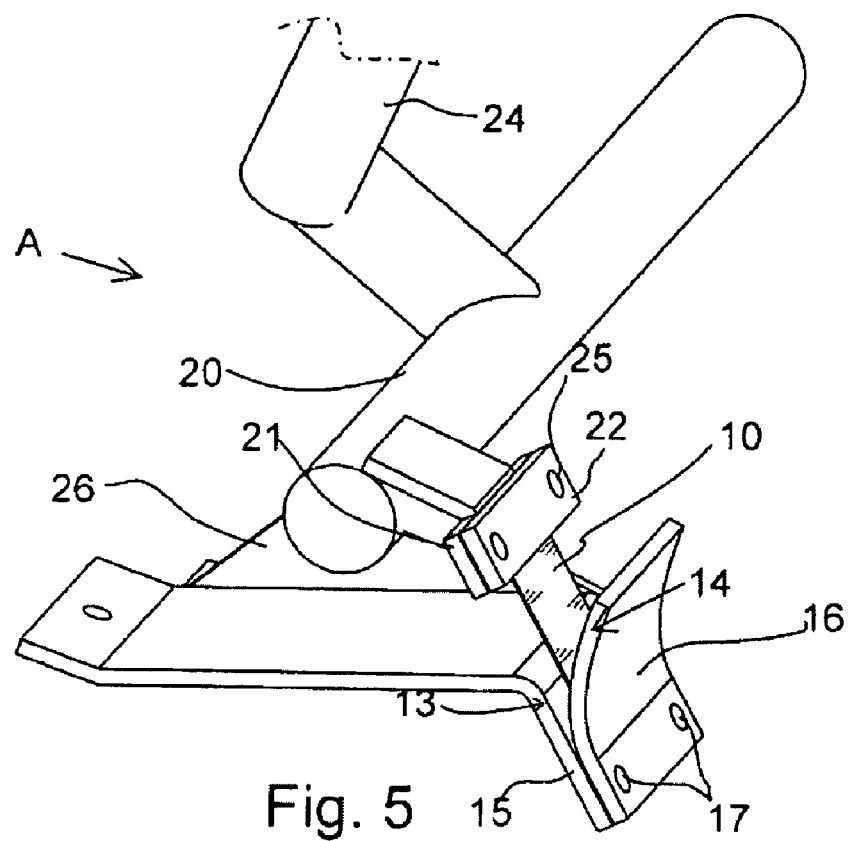
FIG. 5 shows a perspective view of the detail A of FIG. 1 or FIG. 4.
Figure 6:
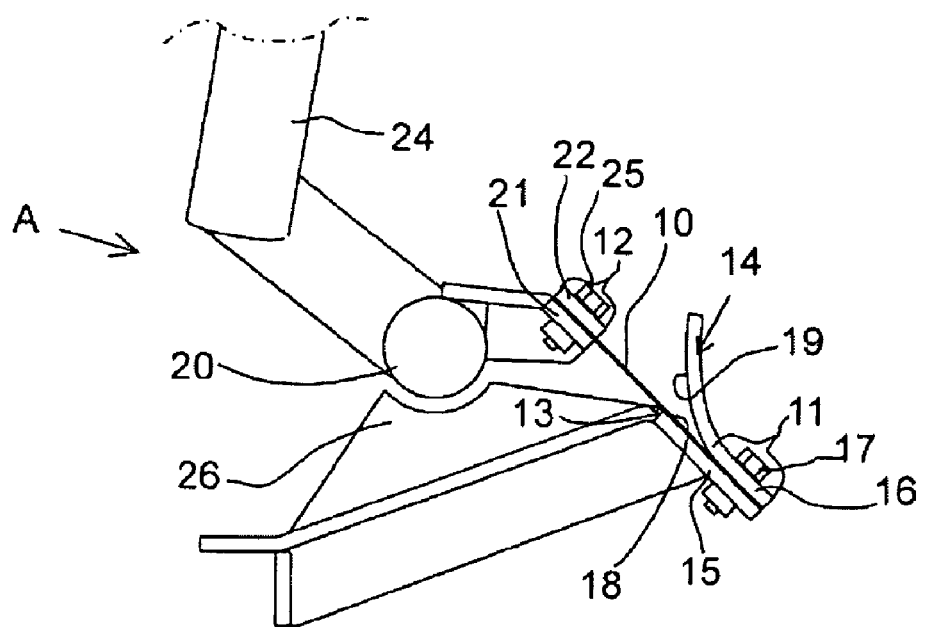
FIG. 6 shows a side view of the detail A of FIG. 1 or FIG. 4.
Figure 7:
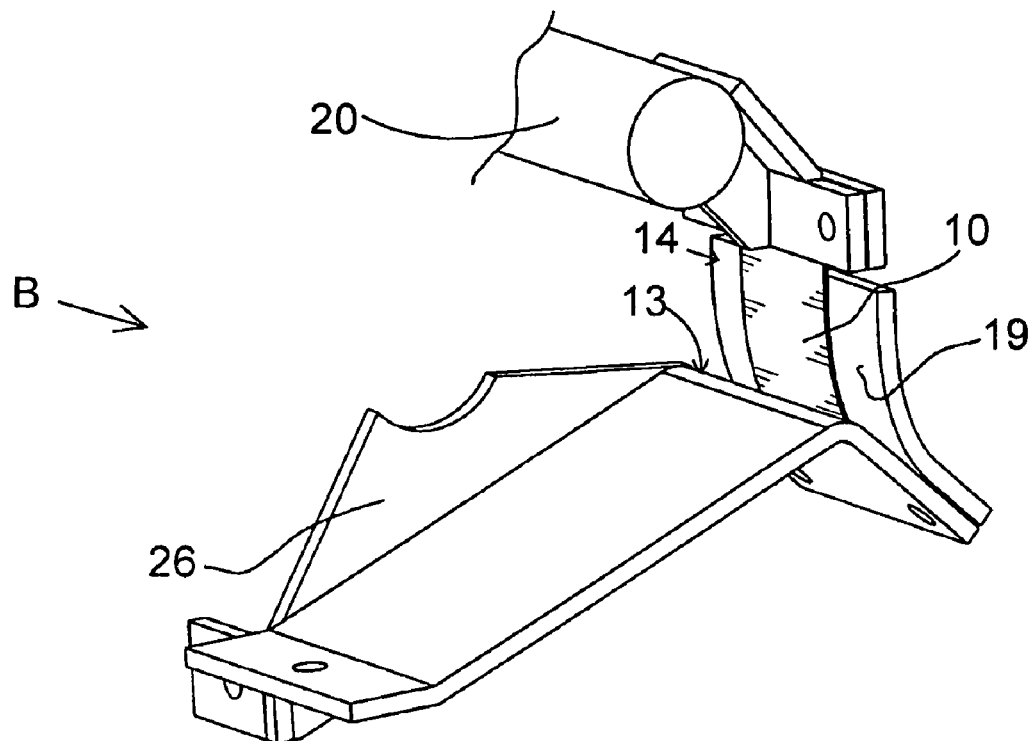
FIG. 7 shows a perspective view of the detail B of FIG. 2 or FIG. 3.
Figure 8:
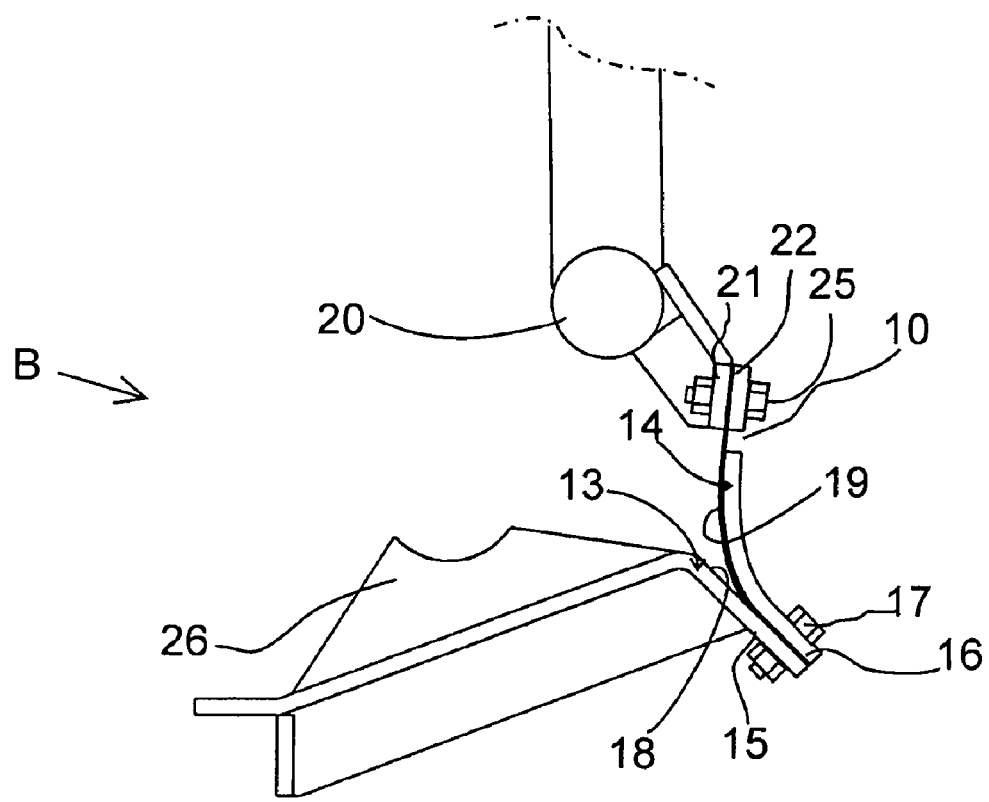
FIG. 8 shows a side view of the detail B of FIG. 2 or FIG. 3.

Referring to FIGS. 5 and 6, a front stop 13 limits the bending of the leaf spring 10 in a forward direction. Referring to FIGS. 7 and 8, a rear stop 14 limits the bending of the leaf spring 10 in a rearward direction.

The first end region 11 of the leaf spring 10 is fixed to the bodywork 3 by a first clamp assembly 15, 16 comprising a first front clamp plate 15 fixedly connected to the bodywork 3, and a first rear clamp plate 16 fixed by a first bolted joint 17 to the first front clamp plate 15. The first end region 11 of the leaf spring 10 is pressed between the first front clamp plate 15 and the first rear clamp plate 16.

The first front clamp plate 15 has a planar extension surface 18 which extends alongside the front side of the flexural spring 10 along a part of the free length of the leaf spring 10 and forms the front stop 13.

The first rear clamp plate 16 has a curved extension surface 19 which extends alongside the rear side of the leaf spring 10 along a part of the free length of the leaf spring and forms the rear stop 14.

Referring to FIG. 6 the second clamp assembly 21, 22 comprises a second front clamp plate 21 fixedly connected to the horizontal bar 20 and a second rear clamp plate 22 is fixed by a second bolted joint 25 to the second front clamp plate 21. The second end region 11 of the flexural spring 10 is pressed between the second front clamp plate and second rear clamp plate.

The first clamp assembly comprises a bracket 26 for supporting the horizontal bar 20 in the closed position III (see FIGS. 5 and 6) of the trunk lid 5 and the frame 9.

Figure 9:
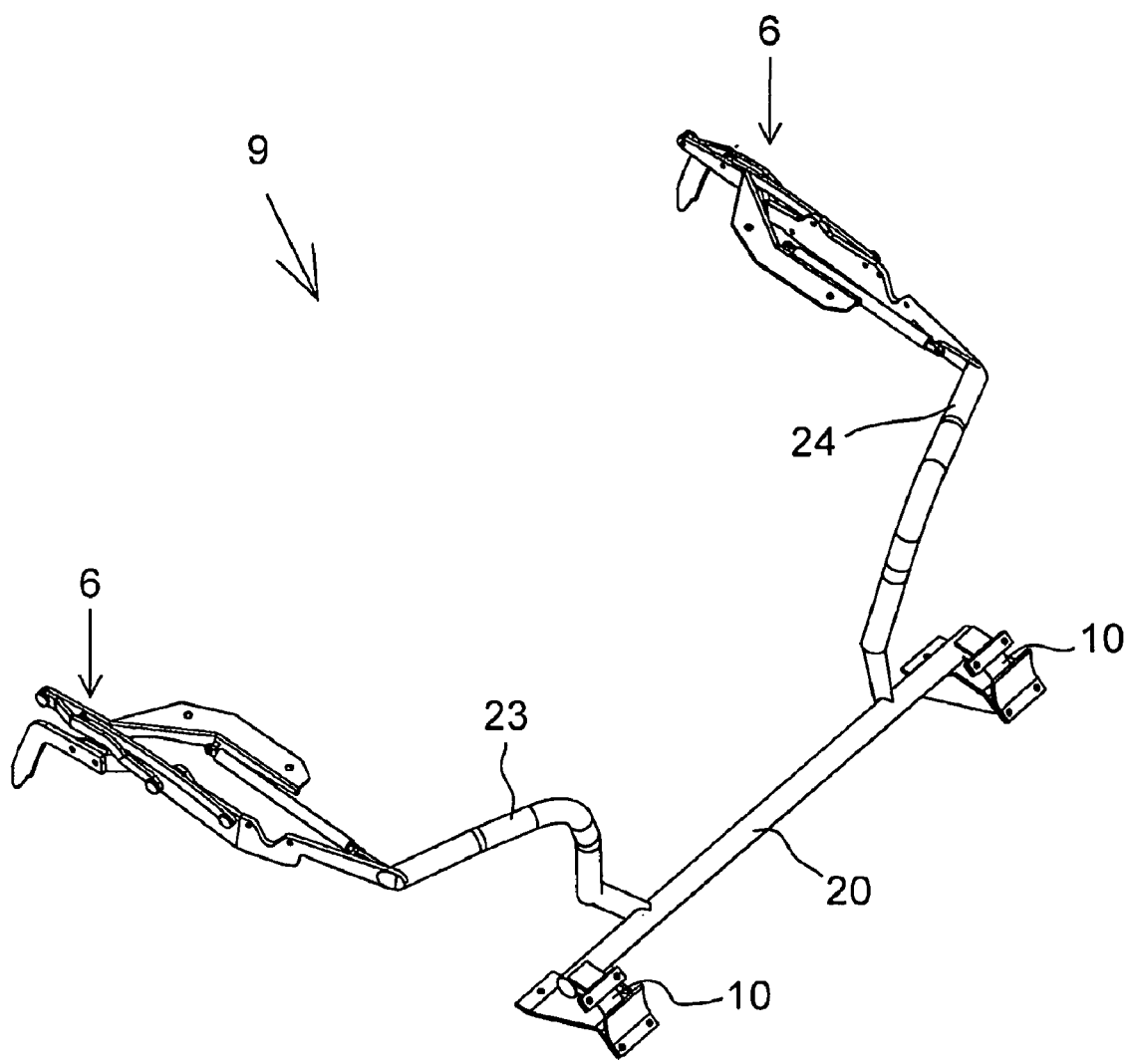
FIG. 9 shows a perspective view of the frame.

Referring to FIG. 9 the frame 9 comprises a horizontal bar 20 running perpendicularly with respect to a longitudinal axis through said vehicle. The horizontal bar 20 has a second clamp assembly 21, 22 by which the frame 9 is fixed to the second end region 12 of the leaf spring 10. Supporting legs 23, 24 are fixed at the ends of the horizontal bar and extend forwardly. Guide linkages 6 are connected to each of supporting legs 23, 24.

Obviously, many modifications and variations of the present invention are possible in light of the above teachings. It is therefore to be understood that within the scope of the appended claims, the present invention may be practiced otherwise than as specifically described herein.

The invention claimed is:

1. A convertible vehicle having a roof structure (1), the roof structure being pivoted via a positive guidance device (2), fixedly supported on a bodywork (3) of the vehicle, from a closed position (I) where the roof structure rests against a front windscreen frame (4) and covers a passenger compartment region to an open position (II) and towards a tail-end region of the vehicle, comprising:

- a trunk lid (5) being supported by a guide linkage (6), the roof structure (1) being lowerable into a folding-top compartment (7) located in an upper region of the trunk (8) of the vehicle under said trunk lid; and
- a frame (9) on which said trunk lid (5) is articulated via said guide linkage (6), said frame being supported by a connecting element (10) on the bodywork in a lower vehicle end region, said connecting element enabling turning of said frame,
- wherein said trunk lid (5) is pivoted by a first movement by guidance of the guide linkage (6) from a closed position (III) into a first open position (IV) opening the trunk towards the rear to enable loading and unloading said trunk,
- wherein a forward end of said trunk lid (5) together with a forward end of said frame (9) is turned upwards by a second movement from the closed position (III) to a second open position (V) to expose upwards the folding-top compartment (7) for enabling said roof structure (1) to be moved to said open position (II) and into said folding-top compartment (7), and
- wherein the only connecting element (10) between the frame (9), to which the trunk lid is connected, and the bodywork (3) is a flexural spring (10) having a first end region (11) fixed with respect to the bodywork (3) and a second end region (12) fixed to the frame (9), the frame and the bodywork being free of any stationary pivot joint therebetween.

2. A convertible vehicle according to claim 1, wherein the flexural spring (10) is a leaf spring.

3. A convertible vehicle according to claim 2, wherein the leaf spring (10) consists of a single leaf.

4. A convertible vehicle according to claim 3, wherein the leaf spring (10) has a substantially rectangular shape with a uniform thickness.

5. A convertible vehicle according to claim 2, wherein the leaf spring (10) is made of spring steel.

6. A convertible vehicle according to claim 2, wherein the leaf spring (10) is made of fiber reinforced plastic.

7. A convertible vehicle according to claim 1, wherein the frame (9) is supported to the bodywork (3) by at least two flexural springs (10) spaced from each other in a lateral direction of the vehicle.

8. A convertible vehicle according to claim 1, wherein the vehicle comprises a front stop (13) for limiting the bending of the flexural spring (10) in a forward direction, and a rear stop (14) for limiting the bending of the flexural spring in a rearward direction.

9. A convertible vehicle according to claim 8, wherein the first end region (11) of the flexural spring (10) is fixed to the bodywork (3) by a first clamp assembly (15, 16) comprising a first front clamp plate (15) fixedly connected to the bodywork (3), and a first rear clamp plate (16) fixed by a first bolted joint (17) to the first front clamp plate, the first end region (11) of the flexural spring (10) being pressed between the first front clamp plate and the first rear clamp plate.

10. A convertible vehicle according to claim 9, wherein the first front clamp plate (15) has a planar extension surface (18) extending alongside the front side of the flexural spring (10) along a part of the free length of the flexural spring and forming said front stop (13).

11. A convertible vehicle according to claim 9, wherein the first rear clamp plate (16) has a curved extension surface (19) extending alongside the rear side of the flexural spring (10) along a part of the free length of the flexural spring and forming said rear stop (14).

12. A convertible vehicle according to claim 1, wherein the frame (9) comprises:

- a horizontal bar (20) running perpendicularly with respect to a longitudinal axis through said vehicle, said horizontal bar having a second clamp assembly (21, 22) by which the frame (9) is fixed to the second end region (12) of the flexural spring (10), and
- supporting legs (23, 24) fixed at the ends of the horizontal bar and extending forwardly, a guide linkage (6) being connected to each of said supporting legs (23, 24).

13. A convertible vehicle according to claim 12, wherein the second clamp assembly (21, 22) comprises a second front clamp plate (21) fixedly connected to the horizontal bar (20) and a second rear clamp plate (22) fixed by a second bolted joint (25) to the second front clamp plate (21), the second end region (11) of the flexural spring (10) being pressed between the second front clamp plate and second rear clamp plate.

14. A convertible vehicle according to claim 12, wherein the first clamp assembly comprises a bracket (26) for supporting the horizontal bar (20) in the closed position (III) of the trunk lid (5) and the frame (9).

15. A convertible vehicle according to claim 10, wherein the first rear clamp plate (16) has a curved extension surface (19) extending alongside the rear side of the flexural spring (10) along a part of the free length of the flexural spring and forming said rear stop (14).

16. A convertible vehicle according to claim 13, wherein the first clamp assembly comprises a bracket (26) for supporting the horizontal bar (20) in the closed position (III) of the trunk lid (5) and the frame (9).

17. A convertible vehicle according to claim 13, wherein the first clamp assembly comprises a bracket (26) for supporting the horizontal bar (20) in the closed position (III) of the trunk lid (5) and the frame (9).

18. A convertible vehicle according to claim 1, wherein the flexural spring is arranged to be freely placed inside a sealing line of the trunk.

* * * * *